Patented May 1, 1923.

1,453,993

UNITED STATES PATENT OFFICE.

CALVIN PAYTON, OF DOUGLAS, ARIZONA, ASSIGNOR OF FIFTY-FIVE ONE-HUNDREDTHS TO PHELPS DODGE CORPORATION, A CORPORATION OF NEW YORK.

METALLURGICAL REFRACTORY MATERIAL AND PROCESS OF PRODUCING THE SAME.

No Drawing.   Application filed January 17, 1919.   Serial No. 271,738.

*To all whom it may concern:*

Be it known that CALVIN PAYTON, citizen of the United States, residing at Douglas, in the county of Cochise and State of Arizona, has invented certain new and useful Improvements in Metallurgical Refractory Materials and Processes of Producing the Same, of which the following is a specification.

This invention has as its object a novel refractory material and process of producing same, which material is especially designed for use in lining converters, reverberatory and other metallurgical furnaces, crucibles, and in fact in any place where the reduction of metals is accomplished through fusion. The invention more especially has as its object the provision of a substitute for the magnesite brick employed in lining converters. Such linings must be frequently renewed because of the rapid deterioration of the brick in the operation of the converter, and the obtaining of these bricks in some localities is a matter of serious concern. In fact, there are times and localities when and where it is practically impossible to obtain magnesite brick.

The material which I propose to employ is a slag having a high magnetite content and low in its silica content. This material I prepare in the following manner: Copper matte is blown in a converter without the addition of the usual excess silica and, as a result, a slag high in magnetic iron oxide and low in silica is produced, and this slag while molten may be poured into suitable molds and will upon cooling form bricks which may be employed for the purpose stated. In producing this magnetite slag, in the manner above pointed out, the temperature within the converter will rise as high as 2600° F. to 2700° F. and it is at this temperature that the rapid oxidization of the iron content occurs and the magnetic oxide is formed. As the ordinary working temperature of a converter ranges from 2200° F. to 2350° F., it will be understood that a lining of the magnetite slag will readily withstand this lower temperature. Of course the slag may be employed in various ways. It may, as stated, be molded in the form of bricks, it may be cast in lining sections of various shapes and dimensions, crucibles may be cast therefrom, and in fact the material may be employed as a lining or as a body material wherever the reduction of metals by fusion is to be accomplished.

It will be evident from the foregoing that the magnetite slag may be readily and economically produced wherever a converter is being run and consequently geographical location does not enter into the question nor does the proposition of transportation of material, although these are factors which require serious consideration where magnesite brick is employed as a converter or furnace lining.

Having thus described the invention, what is claimed as new is:

1. The process of producing metallurgical refractory material which comprises blowing copper matte without the addition of silica and separating the resulting slag.

2. The process of producing metallurgical refractory lining brick which comprises blowing copper matte without the addition of silica and pouring the resulting slag into a mold and allowing the same to cool.

3. Metallurgical refractory material consisting of the slag which is produced when copper matte is blown without the addition of silica and to a temperature between 2600° F. and 2700° F.

In testimony whereof he affixes his signature.

CALVIN PAYTON.  [L. S.]